US010156994B2

United States Patent
Ayyavu

(10) Patent No.: US 10,156,994 B2
(45) Date of Patent: Dec. 18, 2018

(54) METHODS AND SYSTEMS TO REDUCE SSD IO LATENCY

(71) Applicant: Western Digital Technologies, Inc., Irvine, CA (US)

(72) Inventor: Vetrivel Ayyavu, Austin, TX (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 380 days.

(21) Appl. No.: 14/633,301

(22) Filed: Feb. 27, 2015

(65) Prior Publication Data

US 2016/0253091 A1    Sep. 1, 2016

(51) Int. Cl.
*G06F 3/06*    (2006.01)

(52) U.S. Cl.
CPC ............ *G06F 3/061* (2013.01); *G06F 3/0631* (2013.01); *G06F 3/0635* (2013.01); *G06F 3/0688* (2013.01); *G06F 3/0653* (2013.01)

(58) Field of Classification Search
CPC ...... G06F 3/061; G06F 3/0688; G06F 3/0631; G06F 3/0653; G06F 3/0635
USPC ........................................................ 711/103
See application file for complete search history.

(56) References Cited

U.S. PATENT DOCUMENTS

| 8,271,720 | B1 | 9/2012 | Hwu et al. |
| 8,341,311 | B1 | 12/2012 | Szewerenko et al. |
| 8,589,655 | B2 | 11/2013 | Colgrove et al. |
| 9,354,812 | B1 * | 5/2016 | Cheng ................ G06F 3/0608 |
| 2007/0011396 | A1 * | 1/2007 | Singh ................ G06F 13/4059 |
| | | | 711/105 |
| 2009/0292865 | A1 * | 11/2009 | Hong ................ G06F 3/0613 |
| | | | 711/103 |
| 2009/0327590 | A1 | 12/2009 | Moshayedi |
| 2010/0247094 | A1 * | 9/2010 | Young ................ H04L 41/142 |
| | | | 398/25 |
| 2013/0097433 | A1 | 4/2013 | Boorman et al. |
| 2013/0132643 | A1 | 5/2013 | Huang |

(Continued)

FOREIGN PATENT DOCUMENTS

CN    103049216    4/2013

OTHER PUBLICATIONS

"Intel RAID SSD Cache with Fast Path* I/O", http://www.intel.com/content/www.us/en/servers/raid/raid-ssd-cache.html, accessed May 21, 2014, 4 pages.

(Continued)

*Primary Examiner* — Hua J Song
(74) *Attorney, Agent, or Firm* — Patterson & Sheridan, LLP; Steven Versteeg

(57) ABSTRACT

Techniques for reducing Solid State Device Input/Output latency are disclosed. In some embodiments, the techniques may be realized as a method for reducing Solid State Device Input/Output latency comprising receiving a write request at a Solid State Device, monitoring a plurality flash memory channels of the Solid State Device to identify Input/Output requests, evaluating, using load balancing circuitry, identified Input/Output requests to determine a load of one or more of the plurality of flash memory channels, and assigning a destination flash memory channel out of the plurality of flash memory channels to the write request based on the determined load.

20 Claims, 4 Drawing Sheets

(56) References Cited

U.S. PATENT DOCUMENTS

2013/0159609 A1    6/2013  Haas et al.
2016/0188223 A1*   6/2016  Camp .................. G06F 3/0613
                                                        711/103

OTHER PUBLICATIONS

Shim et al., "MNK: Configurable Hybrid Flash Translation Layer for Multi-Channel SSD", IEEE 15th International Conference on Computational Science and Engineering (CSE), pp. 445-452, Dec. 5-7, 2012, accessed on May 21, 2014, at http://ieeexplore.ieee.org/xpl/articleDetails.jsp?tp=&arnumber=641732 . . . 2 pages (Abstract Only).

\* cited by examiner

METHODS AND SYSTEMS TO REDUCE SSD IO LATENCY

BACKGROUND

Solid State Device (SSD) architecture may face performance challenges based on how efficiently flash memory physical channels and their respective flash memory are utilized. As new SSD controller architectures emerge, SSD bandwidth may increase. However, SSD performance may still face challenges based on Input/Output (I/O) utilization of flash channels. Flash memory controllers may receive interleave or pipeline write and/or read commands for different memories or flash memory dies associated with a channel. A channel, or bus, may be connected to multiple dies, but may only permit access to one die at a time. Depending on utilization of a particular channel, I/O latency may increase.

In view of the foregoing, it may be understood that there may be significant problems and shortcomings associated with current technologies for managing I/O utilization of flash memory channels.

SUMMARY OF THE DISCLOSURE

Techniques for reducing Solid State Device Input/Output latency are disclosed. In some embodiments, the techniques may be realized as a method for reducing Solid State Device Input/Output latency including receiving a write request at a Solid State Device, monitoring a plurality flash memory channels to identify Input/Output requests, evaluating, using load balancing circuitry, identified Input/Output requests to determine a load of one or more of the plurality of flash memory channels, and assigning a destination flash memory channel out of the plurality of flash memory channels to the write request based on the determined load.

In accordance with additional aspects of this embodiment, the identified Input/Output requests may include write requests.

In accordance with other aspects of this embodiment, the identified Input/Output requests may include read requests.

In accordance with further aspects of this embodiment, the techniques may further include monitoring free pages in the Solid State Device associated with the plurality flash memory channels.

In accordance with additional aspects of this embodiment, the flash memory channels may include groupings of logical channels and monitoring is organized by groups of logical flash memory channels.

In accordance with other aspects of this embodiment, the flash memory channels may include groupings of physical channels and monitoring is organized by groups of physical flash memory channels.

In accordance with further aspects of this embodiment, monitoring a plurality flash memory channels to identify Input/Output requests may include counting a number of pages transferred per second for each of the plurality of flash memory channels.

In accordance with additional aspects of this embodiment, monitoring a plurality flash memory channels to identify Input/Output requests may include counting a number of words transferred per second for each of the plurality of flash memory channels.

In accordance with other aspects of this embodiment, assigning a destination flash memory channel out of the plurality of flash memory channels to the write request based on the determined load may include a current load of Input/Output requests.

In accordance with further aspects of this embodiment, the assigning a destination flash memory channel out of the plurality of flash memory channels to the write request based on the determined load may include a historical load of Input/Output requests.

In accordance with additional aspects of this embodiment, assignment of the write request may be based on a Quality of Service level associated with the write request.

In accordance with other aspects of this embodiment, in the event a load on each of the plurality of flash memory channels is within a specified range, assignment of the write request to one of the plurality of flash memory channels may be performed on a round robin rotation.

In other embodiments, the techniques may be realized as a computer program product comprised of a series of instructions executable on a computer. The computer program product may perform a process for reducing Solid State Device Input/Output latency. The computer program product may implement the steps of: receiving a write request at a Solid State Device, monitoring a plurality flash memory channels of the Solid State Device to identify Input/Output requests, evaluating, using load balancing circuitry, identified Input/Output requests to determine a load of one or more of the plurality of flash memory channels, and assigning a destination flash memory channel out of the plurality of flash memory channels to the write request based on the determined load.

In yet other embodiments, the techniques may be realized as a system for reducing Solid State Device Input/Output latency. The system may include a storage media device and a device controller associated with the storage media device. The device controller may be configured to: receive a write request at a Solid State Device, monitor a plurality flash memory channels to identify Input/Output requests, evaluate, using load balancing circuitry, identified Input/Output requests to determine a load of one or more of the plurality of flash memory channels, and assign a destination flash memory channel out of the plurality of flash memory channels to the write request based on the determined load.

In accordance with additional aspects of this embodiment, the identified Input/Output requests may include write requests.

In accordance with other aspects of this embodiment, the identified Input/Output requests may include read requests.

In accordance with further aspects of this embodiment, the techniques may further include monitoring free pages in the Solid State Device associated with the plurality flash memory channels.

In accordance with additional aspects of this embodiment, the plurality of flash memory channels may include groupings of logical channels and monitoring may be organized by groups of logical flash memory channels.

In accordance with other aspects of this embodiment, the plurality of flash memory channels may include groupings of physical channels and monitoring may be organized by groups of physical flash memory channels.

In accordance with further aspects of this embodiment, monitoring a plurality flash memory channels to identify Input/Output requests may include counting a number of pages transferred per second for each of the plurality of flash memory channels.

In accordance with additional aspects of this embodiment, monitoring a plurality flash memory channels to identify Input/Output requests may include counting a number of words transferred per second for each of the plurality of flash memory channels.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DESCRIPTION

The present disclosure relates to techniques for reducing Solid State Device (SSD) Input/Output (I/O) latency. A SSD may have multiple physical flash channels and each physical flash channel may provide access to multiple flash memory dies. A physical channel may provide access to one flash memory die (for either a read or a write Input/Output request) at a time. An SSD may have multiple physical channels and several physical channels may be grouped to form a logical channel. Logical channels may be further grouped. Free or empty pages associated with one or more memory dies may be tracked. Free or empty pages may be associated with physical channels, logical channels, and/or logical channel groups. Physical channels, logical channels, and/or logical channel groups may be monitored to identify I/O requests per channel. I/O requests may include write requests, read requests, or both. Information about I/O requests may be used to identify channels to assign to write requests. Assignments may be made based in part on a load of one or more channels associated with one or more I/O requests.

Figure 1:
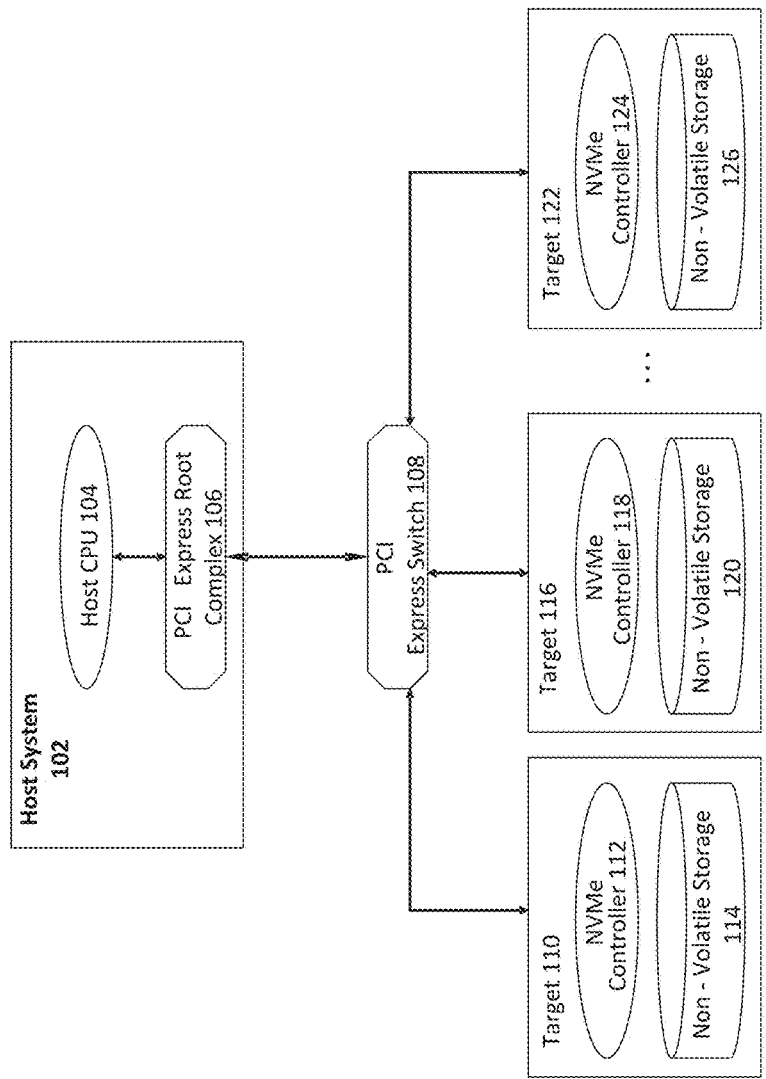
FIG. 1 shows a block diagram depicting a plurality of PCIe devices in communication with a host device, in accordance with an embodiment of the present disclosure.

Turning now to the drawings, FIG. 1 is a block diagram depicting a PCIe device in communication with a host device, in accordance with an embodiment of the present disclosure. FIG. 1 includes a number of computing technologies such as a host system 102, host CPU 104, and PCI express root complex 106. PCI express switch 108 may communicatively couple a plurality of targets (e.g., PCIe devices such as NVMe based targets) such as Targets 110, 116 and 122 to host system 102 via PCI express root complex 106.

Target 110 may contain NVMe controller 112 and non-volatile storage 114. Target 116 may contain NVMe controller 118 and non-volatile storage 120. Target 122 may contain NVMe controller 124 and non-volatile storage 126. FIG. 1 may depict a high level view of a PCIe device in communication with a host device. As described in further detail in reference to FIG. 2 below, embodiments of the disclosure may improve performance between NVMe controllers and non-volatile storage. Embodiments may improve performance by balancing a load among flash memory channels handling I/O requests to and/or from non-volatile storage.

Memory based resources may be accessible to Host System 102 via a memory interface (e.g., double data rate type three synchronous dynamic random access memory (DDR3 SDRAM)). Memory can take any suitable form, such as, but not limited to, a solid-state memory (e.g., flash memory, or solid state device (SSD)), optical memory, and magnetic memory.

According to some embodiments, interfaces standards other than PCIe may be used for one or more portions including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), and Universal Flash Storage (UFS).

The host system 102 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system.

The host system 102 and the target device can include additional components, which are not shown in FIG. 1 to simplify the drawing. For example, in some embodiments one or more elements of FIG. 2 may be present in FIG. 1. An NVMe controller may contain a CPU and/or other hardware engines, and a Flash channel interface. Non-volatile storage may contain one or more flash memories/dies. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller.

Figure 2:
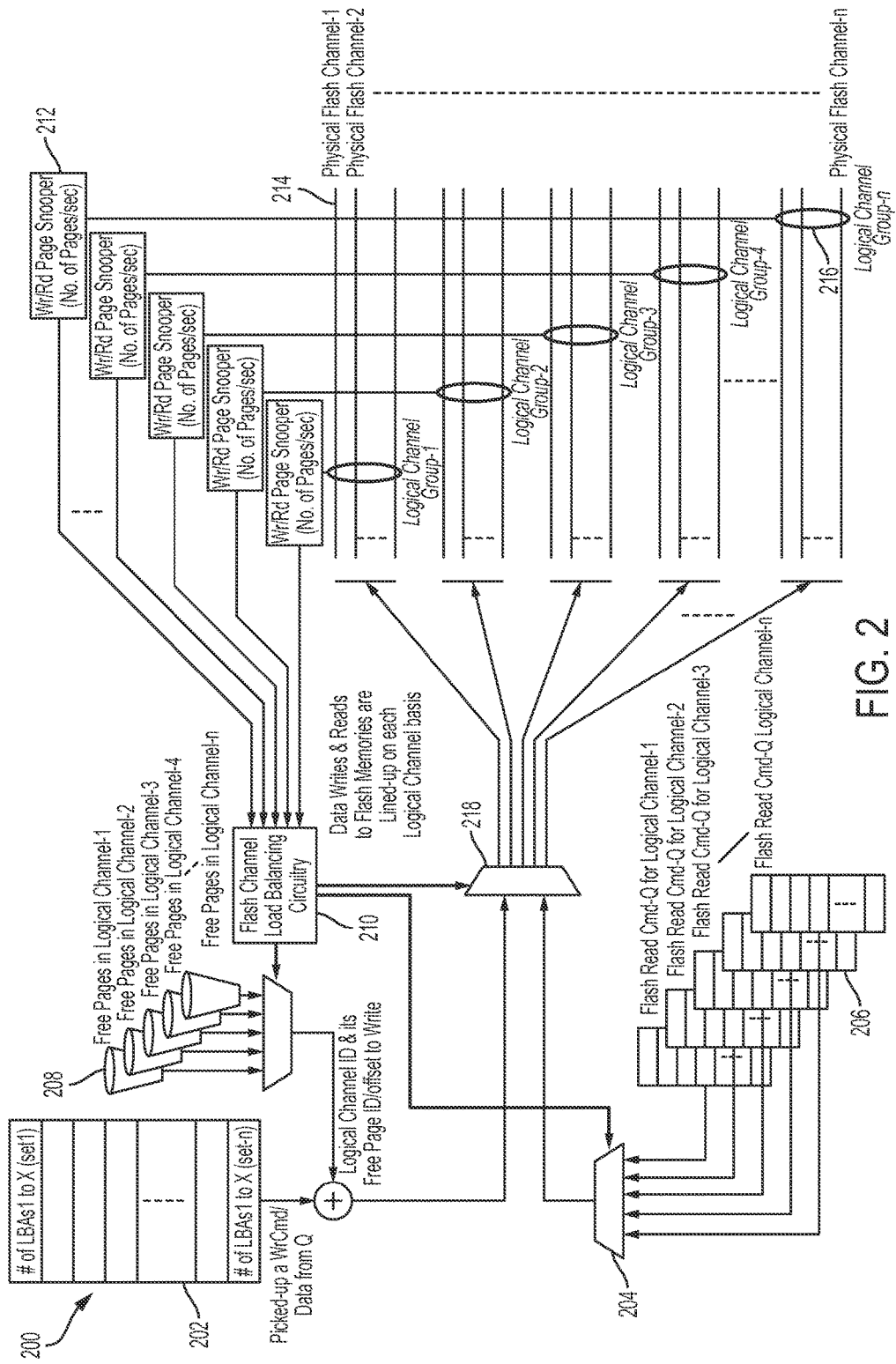
FIG. 2 depicts a block diagram illustrating a system for reducing Solid State Device Input/Output latency in accordance with an embodiment of the present disclosure.

FIG. 2 depicts a block diagram illustrating a system for reducing Solid State Device Input/Output latency in accordance with an embodiment of the present disclosure. SSD 200 may contain queue 202 for storing flash write commands and flash read command queue 206 for storing flash read commands Read commands may be forwarded from flash read command queue 206 to multiplexer 204 and from multiplexer 204 to multiplexer switch 218. Multiplexer switch 218 may direct flash read commands to an appropriate logical channel group 216 containing the physical flash channel 214 having the data corresponding to the read request. Flash channel load balancing module 210 may use free page information from data structure 208 and data from page monitors 212 to identify write destination information (e.g., a logical channel ID, a free page ID and an offset) from data structure 208 for a write request. A write request and selected write destination information for the write request may be forwarded from queue 202 to multiplexer switch 218. Multiplexer switch 218 may forward the write request to the selected write destination (e.g., a logical channel group having a selected logical channel ID, a free page ID and an offset).

As illustrated in FIG. 2, SSD 200 may contain a queue 202 for queuing flash memory write commands (e.g., received from a host). According to some embodiments, data (e.g., Logical Block Addresses (LBAs)) may be written to queue 202. Write command data may be written to queue 202 by a CPU and/or software (e.g., a driver and/or a PCIe controller). The exact destination of each flash write command may be determined by flash channel load balancing module 210.

A write command may be framed for transferring or writing one or a group of LBAs into flash memory (Logical LBA grouping may be left to the implementation choice). As illustrated the write commands can be in a one common queue. In some embodiments more than one queue may be used.

As shown, Free memory pages may be tracked by data structure 208. Data structure 208 may be a list, a table, or another data structure used to track free or empty flash memory pages. Free memory pages may be tracked by association with a physical channel, association with a logical channel, association with a group of logical channels, or in another arrangement. For example, in some embodiments, free or empty pages may be tracked using super page group IDs and offsets associated with free or empty pages in flash memory dies for each logical channel group (e.g., free memory pages in Logical Channel-1). Super-pages may be a logical grouping of multiple flash pages.

As illustrated, there may be a plurality of data structures 208 (e.g., data structures 208 (1 . . . n)) and a data structure 208 may be associated with each logical flash memory channel grouping (e.g., logical channels 216 (1 . . . n)). According to some embodiments, data structures 208 may be maintained by higher level software, a CPU, and/or dedicated circuitry.

Typically, a SSD controller may assign a write command to whatever free or empty memory pages are sufficient to handle the associated data. This could cause unnecessary latency if, for example, a large number of free pages associated with a particular logical channel or logical channel group caused a number of write requests to be directed to the same logical channel or logical channel group. Information about which memory pages are free or empty for a logical channel or a logical channel group does not provide an indication of how many writes are queued or in process for that particular logical channel or logical channel group. Page monitors 212 may monitor read requests, write requests or both read and write requests. Page monitors 212 may gather statistics on the I/O requests using a number of flash pages per second, a number of words per second, raw throughput, or another throughput or I/O counting metric. Page monitors 212 may monitor I/O requests at a physical channel level (e.g., physical flash channels 214 (1 . . . n)), a logical flash channel level, and/or a logical flash channel group level (e.g., Logical Channel Group 216 (1 . . . n)). As illustrated, there may be a plurality of page monitors 212, e.g., one for each grouping of flash memory channels (e.g., one for each of logical channel group 216 (1 . . . n) or one for each of physical flash channel 214 (1 . . . n)). Page monitors 212 may provide feedback signaling to flash channel load balancing module 210. According to some embodiments, counting write I/O requests and read I/O requests separately may provide a better granularity on load balancing. Monitoring may be configurable.

According to some embodiments, page monitors 212 may track some level of statistical and/or historical data or data provided by page monitors 212 may be stored and analyzed. For example, a number of read requests may be analyzed to determine a balancing of read requests.

Flash channel load balancing module 210 receives data from one or more of page monitors 212. According to some embodiments, flash channel load balancing module 210 may be automatic load balancing circuitry (e.g., one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller), software, or a combination of both circuitry and software that provides a multiplexer selection based on data from one or more of page monitors 212. Flash channel load balancing module 210 may use the data from page monitors 212 as feedback to determine load levels of flash channels and to assign write requests accordingly.

According to some embodiments, flash channel load balancing module 210 may help to route a write command onto the least loaded logical channel group. Data from page monitors 212 (e.g., number of pages/second or words/second (words can be a software defined value)) may be compared against each other based on one or more configurable options or values. Based on the result, flash channel load balancing module 210 may instruct multiplexer switch 218 to make a connection between the appropriate queue to logical channels to route the command. According to some embodiments, flash channel load balancing module 210 may assign write commands on a command by command basis. In one or more embodiments, a round robin or rotational scheme may be used if available flash memory channels are equally loaded (e.g., a first write assignment may be made to logical channel group 1, a second to logical channel group 2, etc.). In some embodiments, flash channel load balancing module 210 may perform assignments when a certain threshold or metric is reached (e.g., a specified number write or read requests within a specified time). In some embodiments, read requests may be counted separately from write requests. In other embodiments, all I/O requests may be considered cumulatively for a particular flash channel. In one or more embodiments, assignments for one or more write commands may be prioritized. For example, a write command may have a QoS (Quality of Service) parameter associated with it and a write command associated with a higher QoS may be assigned to a flash memory channel with less associated I/O traffic. Flash channel load balancing module 210 may be configurable and may accept one or more parameters for assigning write commands to flash memory channels.

According to some embodiments, analysis of data and or historical data from page monitors 212 may be used to spot trends or issues. For example, read requests may not be possible to distribute across flash memory channels because required data for a read request may be only available in flash memory associated with one channel. However, if read requests are unbalanced or skewed towards one or more flash memory channels, in some embodiments Flash channel load balancing module 210 may direct more write requests to the remaining flash memory channels. This may ensure that future read requests for the data just written will be directed to flash memory channels receiving fewer read requests and may reduce I/O latency due to a lack of balancing of the read requests across flash memory channels.

As illustrated in FIG. 2, multiplexer 204 may accept a plurality of read requests from flash read command queues 206. Read requests may be forwarded from multiplexer 204 to multiplexer switch 218. As shown, in some embodiments, there may be a flash read command queue 206 for each logical flash channel group. A read command may be framed for reading the LBAs from flash memory. As noted for the write command, one read command can pull one or a group of LBAs.

Figure 3:
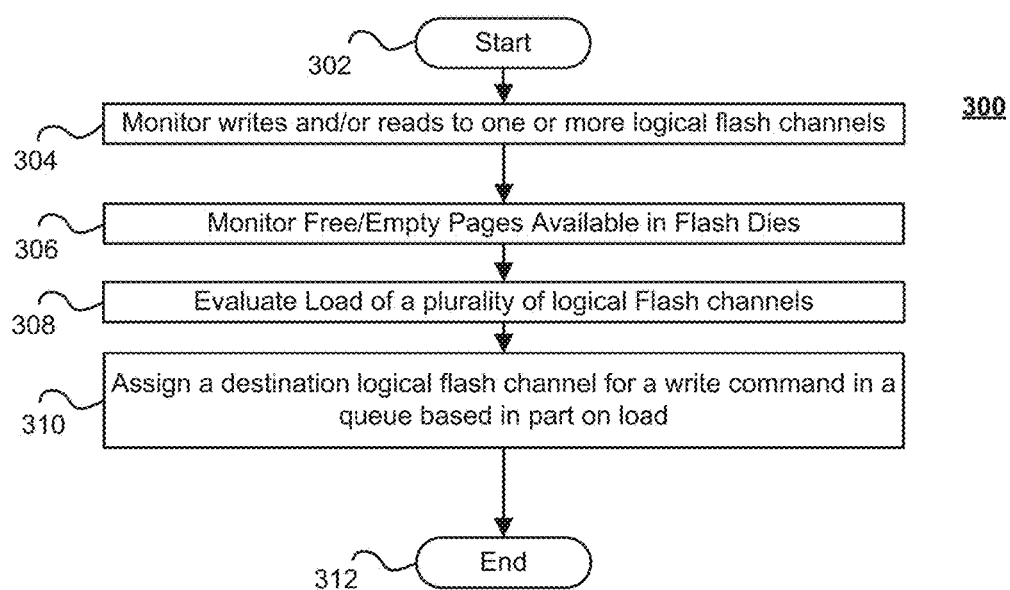
FIG. 3 depicts a flowchart illustrating a method for reducing Solid State Device Input/Output latency, in accordance with an embodiment of the present disclosure.

FIG. 3 depicts a flowchart illustrating a method for reducing Solid State Device Input/Output latency, in accordance with an embodiment of the present disclosure. The process 300, however, is exemplary only. The process 300 can be altered, e.g., by having stages added, changed, removed, or rearranged. The process 300 may begin at block 302.

At block 304 read and/or write requests may be monitored. Page monitors may gather statistics on I/O requests using a number of flash pages per second, a number of words per second, raw throughput, or another throughput or I/O counting metric. Page monitors may monitor I/O requests at a physical channel level (e.g., physical flash channels 214 (1 . . . n), a logical flash channel level, and/or a logical flash channel group level (e.g., Logical Channel Group 216 (1 . . . n))).

At block 306 the free or empty pages available in flash dies may be monitored. Monitoring may be performed using higher level software, a CPU, and/or dedicated circuitry.

Free memory pages may be tracked by data structure such as, for example, a list, a table, or another data structure used to track free or empty flash memory pages. Free memory pages may be tracked by association with a physical channel, association with a logical channel, association with a group of logical channels, or in another arrangement. For example, in some embodiments, free or empty pages may be tracked using super page group IDs and offsets associated with free or empty pages in flash memory dies for each logical channel group. Super-pages may be a logical grouping of multiple flash pages.

There may be a plurality of data structures for tracking free flash memory and they may be associated with each flash memory channel grouping (e.g., logical channels 216 (1 . . . n)). According to some embodiments, data structures 208 may be maintained by higher level software, a CPU, and/or dedicated circuitry.

At block 308 a load of I/O requests on one or more flash channels may be evaluated. A flash channel load balancing module may be implemented using automatic load balancing circuitry, software, or a combination of both circuitry and software.

According to some embodiments, a flash channel load balancing module may help to route a write command onto the least loaded logical channel group. Data from page monitors (e.g., number of pages/second or words/second (words can be a software defined value)) may be compared against each other based on one or more configurable options or values. Based on the result, a flash channel load balancing module may instruct a multiplexer switch to make a connection between an appropriate queue to logical channels to route the command. According to some embodiments, a flash channel load balancing module may assign write commands on a command by command basis. In one or more embodiments, a round robin or rotational scheme may be used if available flash memory channels are equally loaded (e.g., a first write assignment may be made to logical channel group 1, a second to logical channel group 2, etc.). In some embodiments, a flash channel load balancing module may perform assignments when a certain threshold or metric is reached (e.g., a specified number write or read requests within a specified time). In some embodiments, read requests may be counted separately from write requests. In other embodiments, all I/O requests may be considered cumulatively for a particular flash channel. In one or more embodiments, assignments for one or more write commands may be prioritized. For example, a write command may have a QoS (Quality of Service) parameter associated with it and a write command associated with a higher QoS may be assigned to a flash memory channel with less associated I/O traffic. A flash channel load balancing module may be configurable and may accept one or more parameters for assigning write commands to flash memory channels.

According to some embodiments, analysis of data and or historical data from page monitors may be used to spot trends or issues. For example, read requests may not be possible to distribute across flash memory channels because required data for a read request may be only available in flash memory associated with one channel. However, if read requests are unbalanced or skewed towards one or more flash memory channels, in some embodiments a flash channel load balancing module may direct more write requests to the remaining flash memory channels.

At block 310 a flash channel load balancing module provides a multiplexer selection based on data from one or more of page monitors 212. Flash channel load balancing module 210 may use the data from page monitors 212 as feedback to determine load levels of flash channels and to assign write requests accordingly.

At block 312, the method 300 may end.

Figure 4:
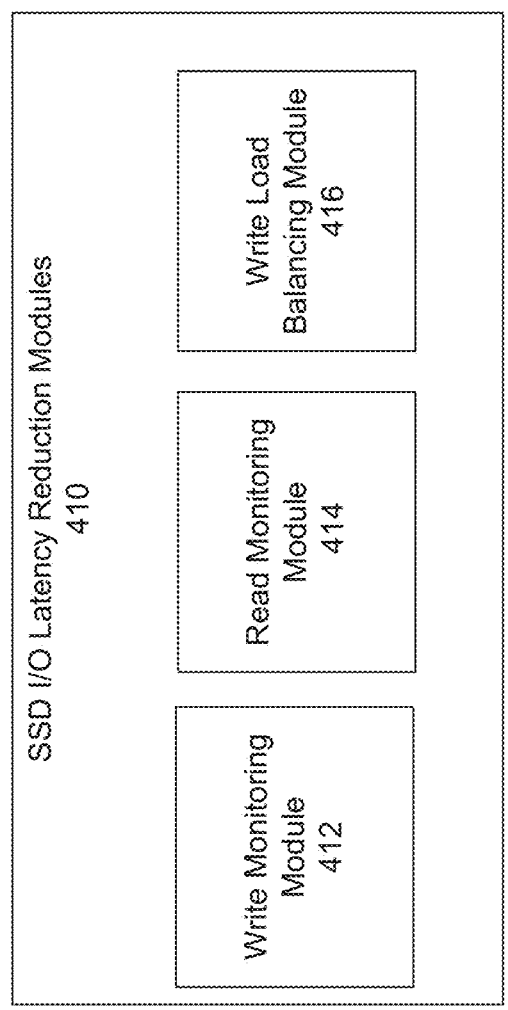
FIG. 4 depicts a module for reducing Solid State Device Input/Output latency, in accordance with an embodiment of the present disclosure.

FIG. 4 depicts modules for reducing Solid State Device Input/Output latency, in accordance with an embodiment of the present disclosure. According to some embodiments, one or more modules may be implemented in the form of one or more of a microprocessor or processor and a computer-readable medium that stores computer-readable program code (e.g., software or firmware) executable by the (micro) processor, logic gates, switches, an application specific integrated circuit (ASIC), a programmable logic controller, and an embedded microcontroller. In some embodiments, one or more modules may be implemented as part of flash channel load balancing module 210 of FIG. 2. As illustrated in FIG. 4, SSD I/O Latency Reduction modules 410 may contain write monitoring module 412, read monitoring module 414, and write load balancing module 416.

Write monitoring module 412 may gather statistics on write requests using a number of flash pages per second, a number of words per second, raw throughput, or another throughput or I/O counting metric. Write monitoring module 412 may monitor write requests at a physical channel level, a logical flash channel level, and/or a logical flash channel group level.

Read monitoring module 414 may gather statistics on read requests using a number of flash pages per second, a number of words per second, raw throughput, or another throughput or I/O counting metric. Read monitoring module 414 may monitor read requests at a physical channel level, a logical flash channel level, and/or a logical flash channel group level.

Write load balancing module 416 may help to route a write command onto the least loaded logical channel group.

Data from read monitoring module 414 and write monitoring module 412 (e.g., number of pages/second or words/second (words can be a software defined value)) may be compared against each other based on one or more configurable options or values. Based on the result, write load balancing module 416 may instruct a multiplexer switch to make a connection between an appropriate queue to logical channels to route the command. According to some embodiments, write load balancing module 416 may assign write commands on a command by command basis. In one or more embodiments, a round robin or rotational scheme may be used if available flash memory channels are equally loaded (e.g., a first write assignment may be made to logical channel group 1, a second to logical channel group 2, etc.). In some embodiments, write load balancing module 416 may perform assignments when a certain threshold or metric is reached (e.g., a specified number write or read requests within a specified time). In some embodiments, read requests may be counted separately from write requests. In other embodiments, all I/O requests may be considered cumulatively for a particular flash channel. In one or more embodiments, assignments for one or more write commands may be prioritized. For example, a write command may have a QoS (Quality of Service) parameter associated with it and a write command associated with a higher QoS may be assigned to a flash memory channel with less associated I/O traffic. Write load balancing module 416 may be configurable and may accept one or more parameters for assigning write commands to flash memory channels.

According to some embodiments, analysis of data and or historical data from page monitors may be used to spot trends or issues. For example, read requests may not be possible to distribute across flash memory channels because required data for a read request may be only available in flash memory associated with one channel. However, if read requests are unbalanced or skewed towards one or more flash memory channels, in some embodiments write load balancing module 416 may direct more write requests to the remaining flash memory channels.

Other embodiments are within the scope and spirit of the invention. For example, the functionality described above can be implemented using software, hardware, firmware, hardwiring, or combinations of any of these. One or more computer processors operating in accordance with instructions may implement the functions associated with for reducing Solid State Device Input/Output latency in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for reducing Solid State Device Input/Output latency comprising:
   receiving a write request at a Solid State Device;
   monitoring a plurality of flash memory channels of the Solid State Device to identify Input/Output requests wherein the monitoring is at a physical channel;
   providing feedback from the monitoring of the plurality of flash memory channels by page monitors to a load balancing module;
   evaluating, using the load balancing module within the Solid State Device, identified Input/Output requests to determine a load of one or more of the plurality of flash memory channels;
   assigning a destination flash memory channel out of the plurality of flash memory channels to the write request to a least loaded logical channel group based on the determined load; and
   instructing a multiplexer switch to make a connection between an appropriate queue to logical channels to route a command using one of a round robin and a rotational scheme.

2. The method of claim 1, wherein the identified Input/Output requests comprise write requests.

3. The method of claim 1, wherein the identified Input/Output requests comprise read requests.

4. The method of claim 1, further comprising:
   monitoring free pages in the Solid State Device associated with the plurality flash memory channels.

5. The method of claim 1, wherein the flash memory channels comprise groupings of logical channels and monitoring is organized by groups of logical flash memory channels.

6. The method of claim 1, wherein the flash memory channels comprise groupings of physical channels and monitoring is organized by groups of physical flash memory channels.

7. The method of claim 1, wherein monitoring a plurality flash memory channels to identify Input/Output requests comprises counting a number of pages transferred per second for each of the plurality of flash memory channels.

8. The method of claim 1, wherein monitoring a plurality flash memory channels to identify Input/Output requests comprises counting a number of words transferred per second for each of the plurality of flash memory channels.

9. The method of claim 1, wherein assigning a destination flash memory channel out of the plurality of flash memory channels to the write request based on the determined load comprises a current load of Input/Output requests.

10. The method of claim 1, wherein the assigning a destination flash memory channel out of the plurality of flash memory channels to the write request based on the determined load comprises a historical load of Input/Output requests.

11. The method of claim 1, wherein assignment of the write request is based on a Quality of Service level associated with the write request.

12. The method of claim 1, wherein in the event a load on each of the plurality of flash memory channels is within a specified range, assignment of the write request to one of the plurality of flash memory channels is performed on a round robin rotation.

13. A system for reducing Solid State Device Input/Output latency, the system comprising:
- a storage media device; and
- a device controller associated with the storage media device, wherein the device controller is configured to:
  - receive a write request at a Solid State Device;
  - monitor a plurality of flash memory physical channels to identify Input/Output requests through page monitors;
  - provide feedback from the monitoring of the plurality of flash memory physical channels by page monitors to a load balancing module within the Solid State Device;
  - evaluate, using load balancing circuitry, identified Input/Output requests to determine a load of one or more of the plurality of flash memory channels; and
  - assign a destination flash memory channel out of the plurality of flash memory channels to the write request to a least loaded logical channel group based on the determined load; and
  - instructing a multiplexer switch to make a connection between an appropriate queue to logical channels to route a command using one of a round robin and a rotational scheme.

14. The system of claim 13, wherein the identified Input/Output requests comprise write requests.

15. The system of claim 14, wherein the identified Input/Output requests comprise read requests.

16. The system of claim 14, further comprising:
monitoring free pages in the Solid State Device associated with the plurality flash memory channels.

17. The system of claim 14, wherein the plurality of flash memory channels comprise groupings of logical channels and monitoring is organized by groups of logical flash memory channels.

18. The system of claim 14, wherein the plurality of flash memory channels comprise groupings of physical channels and monitoring is organized by groups of physical flash memory channels.

19. The system of claim 14, wherein monitoring a plurality flash memory channels to identify Input/Output requests comprises counting a number of pages transferred per second for each of the plurality of flash memory channels.

20. The system of claim 14, wherein monitoring a plurality flash memory channels to identify Input/Output requests comprises counting a number of words transferred per second for each of the plurality of flash memory channels.

* * * * *